United States Patent [19]

Kamath

[11] 4,321,619

[45] Mar. 23, 1982

[54] SECOND ORDER VELOCITY ERROR CORRECTION FOR TIME BASE CORRECTORS

[75] Inventor: Bantval Y. Kamath, San Carlos, Calif.

[73] Assignee: Ampex Corporation, Redwood City, Calif.

[21] Appl. No.: 87,897

[22] Filed: Oct. 24, 1979

[51] Int. Cl.³ .............................................. H04N 5/76
[52] U.S. Cl. ........................................ 358/8; 358/19; 360/36; 360/26
[58] Field of Search ................. 360/36, 26; 358/8, 35, 358/19, 36, 4; 307/590, 269; 328/63, 155, 164

[56] References Cited

U.S. PATENT DOCUMENTS

| | | | |
|---|---|---|---|
| 3,428,745 | 2/1969 | Colemon | 360/36 |
| 3,504,111 | 3/1970 | Sumida | 360/36 |
| 3,580,991 | 5/1971 | Krause | 360/26 |
| 3,994,013 | 11/1976 | Lemoine | 360/26 |
| 4,053,926 | 10/1977 | Lemoine | 360/36 |
| 4,165,524 | 8/1979 | Minomiya | 360/36 |
| 4,212,027 | 7/1980 | Lemoine | 360/36 |

*Primary Examiner*—Bernard Konick
*Assistant Examiner*—Alan Faber
*Attorney, Agent, or Firm*—Roger D. Greer; Ralph L. Mossino; Robert G. Clay

[57] ABSTRACT

A method and apparatus is disclosed for obtaining second order velocity error correction signals for use in a time base corrector that removes instabilities in a video information signal reproduced from a magnetic medium. The apparatus utilizes the phase of the color burst component of the video information signal from successive horizontal lines to determine the change in velocity error. The change in the phase of the burst components of successive horizontal lines is first used to generate a first order or straight line approximation of the velocity error, and the difference between successive changes in burst phase, from which two successive first order error approximations are generated, is used to determine the approximate rate of change of velocity error. This difference is used to generate an error compensating signal that is employed to phase modulate a clock signal that controls the reading of the video information signal stored in a memory in a manner whereby the time base instabilities due to velocity errors are substantially reduced if not eliminated.

17 Claims, 6 Drawing Figures

SECOND ORDER VELOCITY ERROR CORRECTION FOR TIME BASE CORRECTORS

This invention generally relates to the art of time base error correction and more particularly to the correction of progressively changing time base errors introduced into an information signal by dynamic instabilities of a transmission channel through which the information signal passes.

It is generally known that magnetic recording devices, and particularly video tape recorders of whatever type, are signal transmission channels characterized by instabilities that produce time base errors in the video information signal reproduced from the magnetic medium. The existence of the errors produces degradation of the video signal that is displayed on a video monitor, for example; and relatively small timing errors can produce significant visually observable undesirable effects in the resulting picture, particularly when the video information signal is a color video information signal. In this regard, the so-called time base stability that is required for satisfactory monochrome signals is considerably less than that required for satisfactory color signals; and it is generally recognized that errors of up to 150 nanoseconds are generally tolerable for a monochrome signal. However, stability within plus or minus three nanoseconds is generally required in order to provide a color signal that does not produce significant color or hue distortion when displayed.

Because of the significant criticality in the stability requirements for preserving the necessary color quality in the color video information signal upon reproducing, considerable research has been done in the area of identifying the causes of the instability. One of the causes is referred to as velocity error which is produced by a variety of phenomena, some of which include geometric errors, tape tension variations, ambient temperature changes as well as humidity changes. As in the case of all time base errors, velocity errors result from differences between the effective head-to-tape speed during record and that during reproduce. These errors or differences produce a progressive phase shift of the color video signal within each horizontal line of the signal. The progressive phase shift is commonly referred to as velocity error. It is generally necessary to provide correction or compensation for these velocity errors, and this is typically achieved through the use of a time base corrector. Time base correctors are arranged to adjust the phase of the video information signal in accordance with the detected position error of each horizontal synchronizing pulse and a detected phase error of each color burst. This results in the correction of the video signal at the end of each horizontal line but does not eliminate the disturbing effect caused by the erroneous progressive phase shift that occurs during the line and remains uncorrected until the end of the line. Heretofore, time base correctors have been arranged to compensate for such progressive errors by linearly varying the phase of the color video signal during each horizontal line in accordance with the change in the phase of successive color bursts. This approach assumes that the progressive phase errors linearly vary during a line, which is known not to be true.

Time base correctors of most recent design are of the digital type wherein the video information signal is samples at a very high frequency, i.e., 10.7 megasamples per second for the NTSC television system; and each of these samples is then converted to a digital word which is typically eight bits. These digital words are then written into a memory using a clock signal that includes the instabilities of the video signal as determined by the detected error at the beginning of each horizontal line. The digital data words are written out of memory at the same basic frequency of the samples; and the clock signal that is used to read out the digital data words is phase modulated in accordance with the detected progressive or velocity error in a manner whereby all instabilities are compensated for, so that the resulting data stream of digital words which, when converted back to the analog domain, is relatively stable and results in images with visually acceptable color.

It should be appreciated that the circuitry which generates the phase modulated clock signal that is used for reading the data memory must of necessity have acquired the timing error in the signal in order to generate the error correction signal that phase modulates the clock signal itself. The active video portion of most video information signals (video information signals provided with continuous pilot tones being the exception) is comprised of the video images and typically does not contain a known, constant signal component. The only known, constant portion of the signal which can be used to measure the velocity error is that which periodically occurs in the blanking intervals. The 9 to 11 cycles of the chroma subcarrier that are inserted in the color video signal during the horizontal blanking period (which is commonly known and will hereafter be referred to as the color burst) provide a known, constant recurring signal which can be used to detect the instabilities of the resulting video information signal that is derived upon reproducing. Since the color burst occurs only for a short interval during every horizontal line, the information concerning the time base stability of the color video signal necessarily occurs in a sample domain, i.e., at the horizontal line rate of approximately 15,750 Hz.

Prior art time base correctors utilize many different error measurement and correction techniques to compensate color video information signals for the presence of time base errors. The techniques utilized generally depend upon the frequency of the time base errors to be corrected and the accuracy of correction desired. For example, extremely low frequency time base errors are often corrected satisfactorily by an error correction signal generated by a phase locked loop circuit, which circuit corrects the color video signal with respect to the detected phase of the horizontal line synchronizing pulse and color burst that periodically occur in the color video signal. This technique of correction is characterized by a time lag between the occurrence of the error and its correction. While the time lag does not adversely effect the correction process insofar as very low frequency errors are of concern, it does prevent the effective correction of higher frequency time base errors. FIG. 2 includes an illustration of a simplified high frequency variation of time base error. Plot 10 in FIG. 2 represents an actual time base error that progressively varies, for example, during consecutive horizontal lines of the color video signal, with the beginning of the consecutive horizontal lines depicted in FIG. 2 by $S_0$, $S_1$, $S_2$, $S_3$, $S_4$, $S_5$, etc., respectively. The above-described time lag characteristic of phase locked loop circuits is represented in FIG. 2 by the horizontal displacement of plot 12 relative to plot 10, with plot 12 representing the tracking of the time base error by the error correction signal provided by the phase locked loop circuit.

To achieve a more accurate compensation of the progressively varying time base error, or velocity error, an additional time base error correction means is added and is arranged to cooperate with the phase locked loop circuit to perform a correction at the beginning of each horizontal line. This correction is achieved by measuring the difference between the velocity error and the error correction signal provided by the phase locked loop circuit at the beginning of each line and generating a corresponding correction signal that eliminates any measured difference from the error correction signal provided by the phase locked loop circuit whereby the color video signal is phase adjusted at the beginning of each horizontal line to eliminate the then existing time base error. This periodic line-by-line phase correction is effective to eliminate the time lag effect of the phase locked loop correction because each horizontal line is phase corrected at its beginning. However, the progressively varying error that occurs during each horizontal line is not fully corrected. The progressively varying time base error that occurs during a horizontal line is corrected during the line only to the extent possible by the action of the afore-mentioned cooperating phase locked loop circuit. The combined correction effect of the phase locked loop circuit and the periodic line-by-line correction circuitry is represented in FIG. 2 by plot segments 14, 16, 18, 20, 22, 24, 26 and 28. As these plot segments show, the line-by-line correction, represented by vertical plot segments 22, 24, 26 and 28, results in the correction of the color video signal at the beginning of each horizontal line. However, since the correction during each horizontal line is determined by the response of the phase locked loop circuit, the error correction signal will vary during each line like plot 12, except that the line-by-line correction transposes the error correction signal during each line to start from a zero error condition. Plot segments 14, 16, 18 and 20 in FIG. 2 illustrate the transposition.

To achieve still a more accurate compensation of progressively varying time base errors, the most recent prior art time base correctors also include an error correction means that performs a first order linear approximate correction of the progressively varying time base error by phase modulating the video signal in accordance with a correction signal derived by linear interpolation between ajdacent samples of the velocity error, such as represented by the sample points $S_0$ through $S_5$, as shown in FIG. 2. The sample points represent a horizontal line-by-line measurement of the phase of the video signal, which is accomplished by the examination of the phase of the color burst. For example, segment 30 represents a straight line approximation of the velocity error that occurs between color burst sample points $S_0$ and $S_1$. With the addition of the first order linear approximate correction means to the time base corrector, an error compensation is obtained that closely follows higher frequency, progressively varying time base errors. However, because the approximation is linear, the true velocity error during the period between sample times, which follows a generally smooth curve, is never fully corrected. As the frequency of the velocity error increases, the curvature of the velocity error between sample times becomes more pronounced; and the deviation between the true error and the linear approximation increases. For higher frequencies of velocity errors, it is desirable to have a more accurate approximation scheme. This is particularly true with respect to velocity errors that are experienced in video tape recorders in which a magnetic tape is helically wrapped around a tape guide drum while rotating recording and reproducing heads scan the tape. The above-described first order linear approximation technique provides adequate error compensation for relatively low frequency velocity errors, i.e., on the order of about 800 Hz or less; but does not provide particularly good compensation for velocity error frequencies much higher than the 800 Hz. In many helical wrap video tape recorders, such as the VPR Series of Helical Video Tape Recorders manufactured by Ampex Corporation of Redwood City, Calif., the assignee of the present invention, a significant higher frequency velocity error at about 2 kHz is generated, primarily as a result of impacts of the rotating transducing head on the tape.

Accordingly, it is an object of the present invention to provide an improved method and apparatus for achieving more accurate velocity error compensation, and which is particularly capable of compensating signals for the presence of higher frequency velocity errors.

Another object of the present invention is to provide a velocity error compensation method and apparatus of the foregoing type which achieves the improved higher frequency velocity error compensation through the use of a second order approximation, i.e., by generating a velocity error correcting signal using the rate of change of velocity error.

Other objects and advantages will become apparent upon reading the following detailed description of the present invention, while referring to the attached drawings, in which:

FIG. 1 is a simplified block diagram of the apparatus of the present invention and which can be used to practice the method of the present invention;

FIG. 2 includes a number of plots relating to velocity error versus time and various velocity error corrections;

Broadly stated, the present invention utilizes apparatus for measuring time base errors at successive sample points of a time base reference signal component periodically occurring in a composite information signal and performing a rate of change of time base error approximation, i.e., a second order approximation to thereby acquire a more accurate representation of the true time base error. The approximation is used to generate an error signal that is directly prportional to the actual time base error, from which an error correction signal is derived that is employed to reduce or remove the time base error. With the second order approximation, a correction signal can be generated that very closely approximates a non-linearly varying time base error, assuming it varies generally continuously without abrupt discontinuities, as is normally the case. A preferred embodiment of the invention now will be described as arranged to correct velocity errors that commonly occur in color television signals reproduced from a magnetic medium. However, the invention is useful for correcting comparable time base errors in other information signals containing a time base reference signal component that permits the time base of the information signal to be measured periodically.

Figure 5:
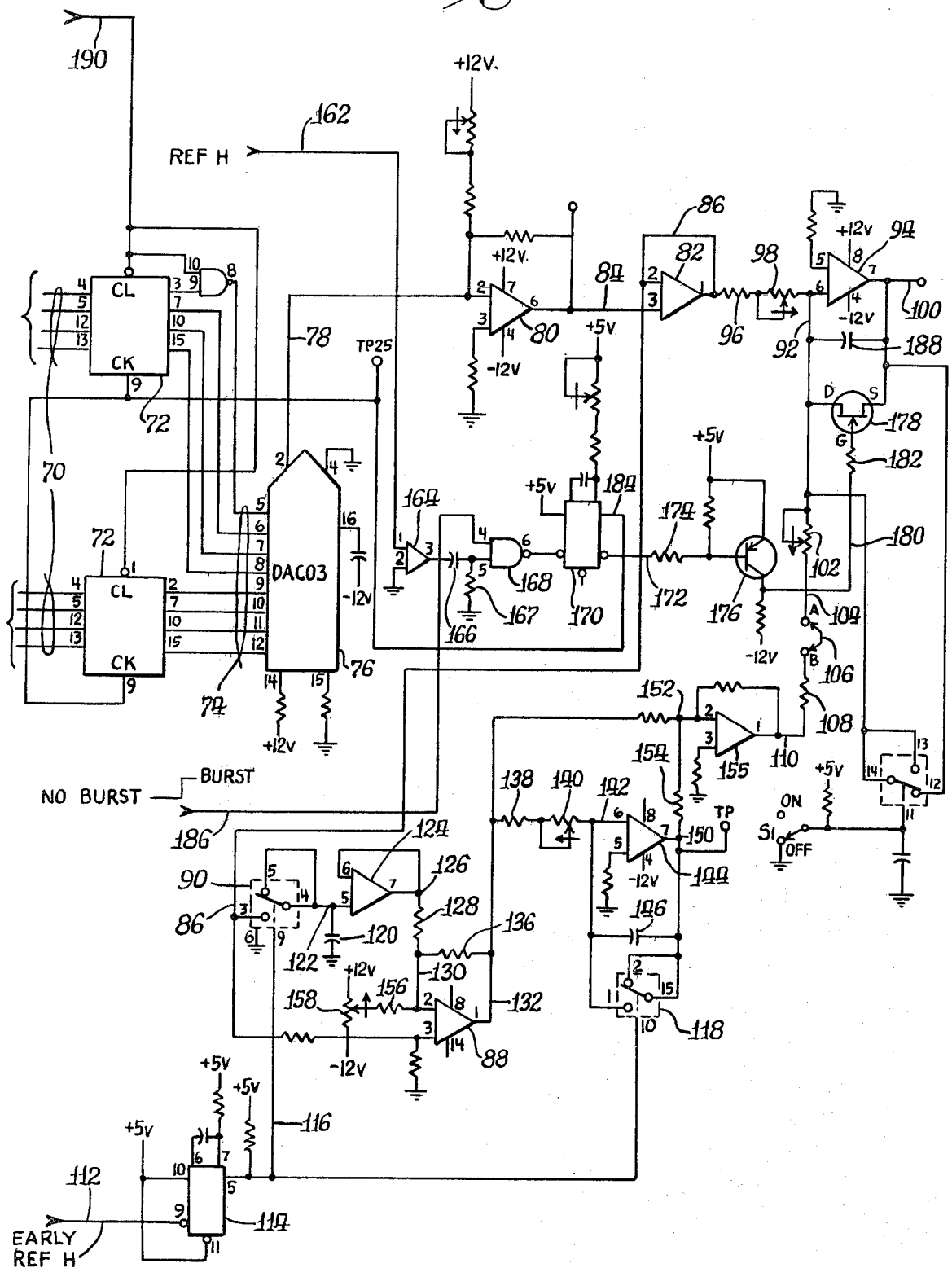
FIG. 5 is a detailed schematic diagram of circuitry which can be used to carry out the operation of the block diagram shown in FIG. 1.

One preferred embodiment of the apparatus is used in conjunction with a digital time base error compensating device manufactured by Ampex Corporation of Redwood City, Calif., and designated as the TBC-2; and the circuitry of FIG. 5 can be incorporated into the circuitry of the TBC-2 and particularly the circuitry shown in the schematic diagram contained on drawing number 1402451, sheets 1 and 2. This drawing as well as the other material contained in the Instruction Manual, No. 1809381 dated December, 1978, are specifically incorporated by reference herein. It should be appreciated that the digital time base corrector has digital memory sufficient to provide an average delay of at least about 5 horizontal lines between the time digitized video information is written into the memory and the time the same digitized video information signal is read from the memory. Thus, the time between the writing in of the data and the reading out of the data can be used to acquire or identify the velocity error that is present in the video information signal that is written into the memory of the time base corrector. Therefore, under normal operation conditions, at least four, if not five, successive horizontal lines of video information are available for determining the velocity error.

Figure 3A:
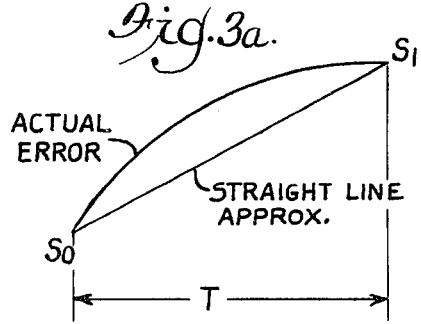
FIG. 3a represents a portion of a representative curve between two sample points, such as is shown in FIG. 2, and is more particularly representative of the straight line approximation scheme.
Figure 3B:
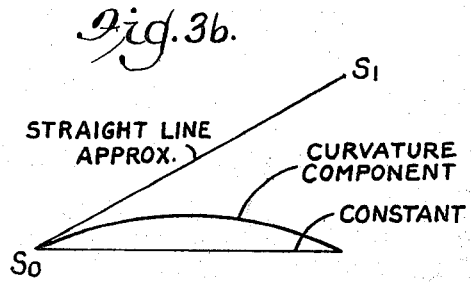
FIG. 3b is a chart which illustrates components of the velocity error and is helpful in explaining the second order approximation that is utilized in the present invention.

In accordance with the method of the present invention, only three successive time base reference representations are needed to generate the second order error correction signal, i.e., an error correction signal corresponding to the rate of change of velocity error; and the apparatus of the present invention can be easily added to the circuitry of the TBC-2 which includes the first order or staight line error correction approximation means in its existing construction. What is accomplished by the present invention is the generation of a second order non-linear or curvature error correction signal that is directly proportional to the velocity error and subsequent addition of the second order change or curvature to the first order error correction signal to more closely conform the resulting velocity error correction signal to the actual velocity error that occurs between successive time base reference representations. The apparatus utilizes detected values of actual velocity error to generate both the first and second order error correction signals. The actual velocity error and, hence, the desired velocity error correction signal between two points, such as between the time base reference signal phase sample points $S_0$ and $S_1$ in FIG. 3b, can be represented by a power series equation. The components of the power series representation fall into three classes; a constant value component, such as $S_0$, a linearly varying value or first order component, such as a straight line approximation of the error between points $S_0$ and $S_1$, and a non-linearly varying value or curvature component, the latter component being shown in greater detail in FIG. 4. The aforementioned more recent time base error correctors include the means by which the video signal is compensated with respect to the constant and first order error components. The non-linear class of varying error components comprises all higher order components above the first order component, and it has been found that obtaining a good approximation of the second order component of the non-linear or curvature class of error components permits an excellent approximation of the actual velocity error to be obtained between sample points. In practice, a second order approximation is made of the curvature or non-linear error component portion, and this second order approximation enables a very good matching of the error correction signal to the actual velocity error. The addition of a second order approximation correction to the aforementioned constant and first order corrections results in the elimination of all objectionable velocity error.

The constant and first order error components can be expressed by the following equation:

$$VE = S_N + (S_{N+1} - S_N)t/T \quad (1)$$

For video information signals, the time base reference signal phase representation values $S_{N+1}$ and $S_N$ are determinable from samples of the phase of two successive color burst intervals. Therefore, the straight line time base error approximation requires only a single horizontal line of delay to enable the arithmetic processing of information from successive one-line separated color bursts to obtain a first order approximation of the actual error from which a corresponding error correction signal is generated for phase modulating the clock signal that is used to read the data from the memory of the time base corrector.

Figure 4:
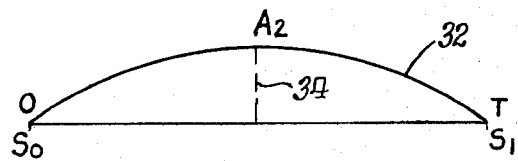
FIG. 4 is another chart illustrating the manner in which the second order approximation is produced.

To provide the higher order or curvature error component compensation and referring to FIG. 4, the curvature error component portion 32 that is present during the period T between the samples $S_0$ and $S_1$ has a degree of curvature that is a function of the chord distance 34. The curvature error component has a value of zero at the time base reference signal phase sample points, i.e., at $t=0$ and at $t=T$, corresponding to sample points $S_0$ and $S_1$ in the illustrated figure. The reason for this is that the straight line error correction means provides an accurate error correction at the sample points. The remaining non-linear higher order error components result from progressive phase shifts that occur in the signal between the sample points. Consequently, errors remain only between the phase sample points.

In accordance with the present invention, a second order approximation of the non-linearly varying time base error is made; and a corresponding error correction signal is generated for compensating the information signal for the presence of the higher order non-linearly varying error components. The second order representation of the non-linear error component can be expressed by the equation:

$$VEC = 4A_2(t/T - 1)t/T \quad (2)$$

which is 0 at $t=0$ and $t=T$, and equals $-A_2$ at $t=T/2$. The second order representation follows a smooth second order curve throughout the interval between the consecutive time base reference samples $S_0$, $S_1$. Ideally, $A_2$ is selected to have a value equal to that of the second differential of the velocity error at $t=T/2$. However, since actual velocity error information is not available during the interval between time base reference samples, it is necessary to generate an approximation of the value of the second differential at $t=T/2$. In the implementation of the present invention, very good compensation of typical velocity errors that are encountered has been obtained by deriving an approximation of the second differential of the velocity error in accordance with the equation:

$$A_2|atS_N = (S_{N+1} - S_N) - (S_N - S_{N-1}) \quad (3)$$

From equations (2) and (3), it is seen that the second order representation of the velocity error is determinable and the corresponding error correction signal derivable from the difference between two successive straight line approximations of the velocity error. Consequently, the second order representation of the error and corresponding error correction signal are obtainable from the detected phase of three successive time base reference signal representations, such as the color bursts from three successive horizontal lines of a color video information signal. Since the TBC-2 digital time base corrector to which reference was previously made normally stores five horizontal lines of video signal information, successive bursts are available to be used to determine the components of the time base error and generate corresponding error correction signals in accordance with the present invention. Hence, no additional memory is necessary; and only circuitry which can perform the arithmetic operations specified by equations (2) and (3) need be provided to implement the second order error correction approximation where the TBC-2 digital time base corrector is used.

Figure 1:
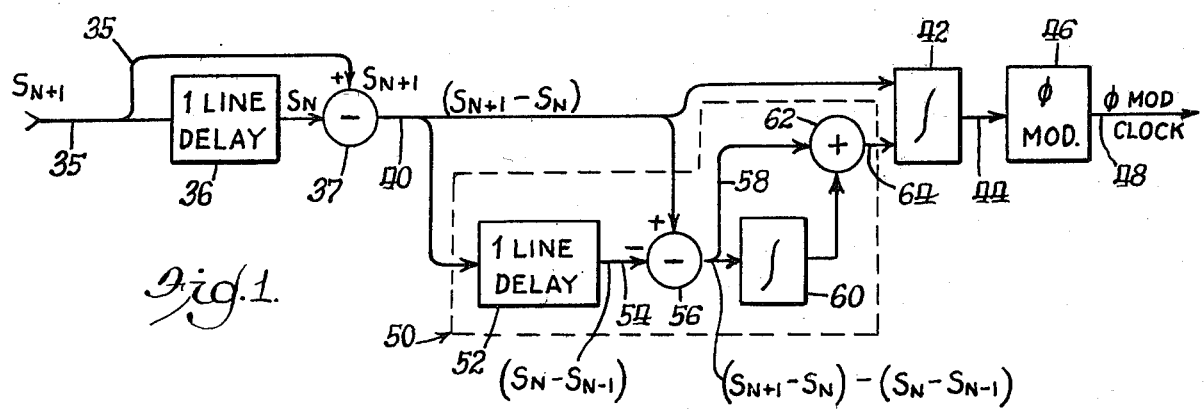
Figure 2:
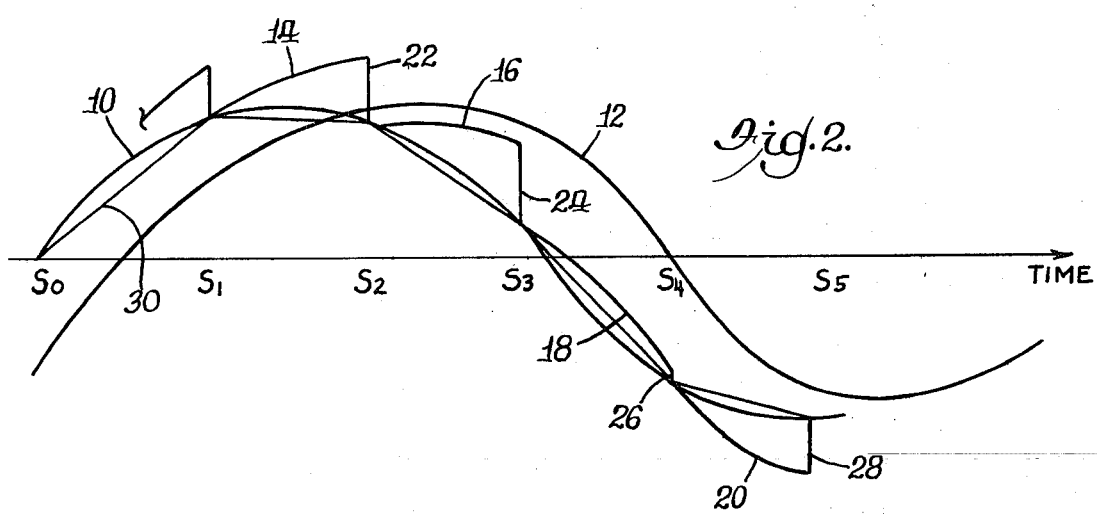

To carry out the first and second order error approximation and corresponding compensation of the velocity error that can be present in a video information signal, apparatus such as that shown in the block diagram of FIG. 1 can be used. A signal having a value representative of the phase of the color burst is applied on a line-by-line basis to input 35, which extends to a one-line delay 36 and to the positive input of a subtractor 37, the negative input of which is supplied by output line 38 of the delay 36. The burst phase representative signal is obtained for each horizontal line of the color video signal by utilizing any of the well-known means for sampling the value of the color burst at a reference time. The output of the subtractor 37 provides a signal representative of the difference between burst phase representations from two successive horizontal lines, and this difference signal appears on line 40 which extends to a main integrator 42 as well as other components that will be described. The difference signal represents the change in burst phase that occurs between the successive color bursts and remains constant during the horizontal line interval following the latter of the subtracted phase representative signals until updated upon the occurrence of another color burst. Thus, the main integrator 42 integrates the constant difference signal to generate a ramp signal on line 44 that includes a component which is a linear approximation of the change of burst phase, hence, velocity error as determined by the difference between the two successive signals representative of the phase of the color burst as has been hereinbefore explained with respect to FIGS. 3a and 3b. The error representative ramp signal on line 44 is applied to an input of a phase modulator 46 which generates an output line 48 the phase modulated clock signal that controls the reading of the digital video data from the memory of the time base corrector. The thusly phase modulated clock signal compensates the video signal in accordance with a first order linear approximation of the velocity error.

As described hereinabove, the TBC-2 digital time base corrector samples the analog video information signal (at a sample rate of 10.7 MHz for NTSC television signals) and subsequently converts these samples into binary digital data representations which are written into the memory employed to remove time base errors that may be present in the video information signal. The time base compensation is accomplished by timing the writing in or storage of the digital data into the memory synchronous to the input video information signal and timing the reading out or retrieval of the digital data from the memory synchronous to a reference. The timing of the writing and reading operations is controlled by clock signals which are derived from the horizontal line and color subcarrier burst time base synchronizing components contained in the input video information signal and comparable reference horizontal line and color subcarrier synchronizing signals provided by a conventional sync generator commonly included in time base correctors. The compensation of the video information signal for the presence of time base errors is performed in two steps. The first compensation step results from the above-described memory writing and reading operations. The phase of the write clock signal is adjusted on a line-by-line basis in accordance with the detected position of the horizontal synchronizing pulse and phase of the color burst at the beginning of each horizontal line of the input video information signal. Since the read clock signal is timed with respect to the comparable reference synchronizing signals, the time of storage of each horizontal line of the video information signal in the memory varies in a complementary fashion according to the difference in the timing of the memory write and read operations. In the second compensation step, the effect of the progressive variation in the time base error during the horizontal line interval, i.e., the remaining velocity error as represented by the difference in the phase of consecutive color burst components, is detected and processed to provide the velocity error signal on line 44 that phase modulates the read clock signal provided by the phase modulator 46 whereby the phase of the read clock signal is caused to vary linearly in a proportionate complementary fashion relative to the detected velocity error. As a result of this second error compensating step, the video information signal read out from the memory is compensated for the first order component of the velocity errors. The portion of the block diagram that has been explained is a part of the straight line approximation apparatus employed in the aforementioned TBC-2 time base corrector.

To accomplish the second order time base error compensation, the portion of the block diagram of FIG. 1 shown within the dotted line 50 operates on the difference signals that are provided by the above-described first order linear approximation error correction circuitry. Thus, the difference signal on line 40 extends to a one-line delay circuit 52, the output of which is present on line 54 which extends to the minus terminal of a subtractor circuit 56, the positive input of which is supplied by the signal on line 40. The output of the subtractor circuit appears on line 58 and necessarily comprises the difference between successive changes in color burst phase as reflected in two successive pairs of color burst phase representations and thereby contains information corresponding to the rate of change of velocity error as is desired. When the phase difference value of $S_{N+1} - S_N$ is present on line 40, the single line delay circuit 52 provides the prior phase difference value $S_N - S_{N-1}$ at its output extending to line 54. The difference value provided by the subtractor circuit is the approximation of the second differential of the time base error discussed hereinbefore with reference to equation (3). A very good approximation of the second order representation of the non-linearly varying error components can be obtained by performing a double integration of the difference value provided by the subtractor circuit 56.

Therefore, after subtraction is carried out by the circuit 56, the difference value $(S_{N+1} - S_N) - (S_N - S_{N-1})$ is placed on line 58 which extends to the input of an integrator 60. The integrator performs the first integration of the difference value, which is in the form of a linearly varying ramp signal. From the foregoing description, it should be appreciated that the difference value integrated by the integrator 60 is constant during each horizontal line interval, being updated upon the occurrence of each color burst and concomitant generation of a color burst phase representative signal. The integrated difference value is applied to one input of an adder 62, which also receives the unintegrated difference value applied by line 58 to a second input. The adder combines the two input signals so that the ramp signal obtained by the integration of the difference value has a zero average D.C. value. The added result is provided on line 64, which extends to the input of the integrator 42, which performs the second integration of the difference value to thereby generate a signal representative of the second order approximation of the non-linearly varying or curvature component of the time base error, as is shown in FIG. 4. Since the TBC-2 time base corrector is capable of fully correcting the video information signal for time base errors at the phase sample points of the time base reference signal or color burst, the second order approximation of the time base error is zero at each of the phase sample points $S_0$, $S_1$, $S_2$, etc. Consequently, there will be no alteration of the ramp signal generated by the integrator 42 at the same times; and the second order approximation of the time base error only affects the ramp signal between color burst phase sample points as has been previously explained.

The portion of the block diagram of FIG. 1 that specifically deals with the second order compensation that is accomplished by the present invention can be implemented by the specific circuitry shown in FIG. 5. As noted hereinbefore, the preferred embodiment of the second order error compensation apparatus is advantageously arranged to cooperate with the error correction circuitry included in the TBC-2 time base corrector. That corrector includes a pair of four bit latches 72 that receive over the input lines 70 an eight bit digital representation of the value corresponding to the difference between the phases of the color bursts of two successive horizontal lines, i.e., the digital value corresponding to the signal that is present on line 40 of the block diagram of FIG. 1. This digital representation of the phase difference between two successive color bursts is available from a buffer memory included in the aforementioned TBC-2 time base corrector that stores the phase difference signal. The buffer memory is connected in the circuit represented by the block diagram of FIG. 1 at the output of the subtractor 37 and provides a matching delay for the phase difference signal corresponding to that provided by the data memory from which the video information signal is read under the control of the error correcting clock signal generated in accordance with the present invention. In the TBC-2 time base corrector, the digital representation of the burst phase difference stored in the buffer memory is obtained from a phase comparator that provides an analog voltage representation of the phase of each color burst on input line 35 of FIG. 1. This representation is referred to as "line error" in the above-identified TBC-2 manual. The one-line delay 36 is a sample and hold circuit that receives the analog voltage representation and holds it for one horizontal line period. The subtractor 37 receives the analog voltage representations of the color burst phases of successive horizontal lines from the one-line delay 36 and the input line 35 and responsively provides an analog voltage representation of the phase difference. This analog phase difference representation is converted by an analog-to-digital converter to the digital representation that is stored in the aforementioned buffer memory.

Returning to the consideration of the circuitry illustrated in FIG. 5, the outputs of latches 72 are coupled to output line 74 extending to a digital-to-analog converter 76. The converter 76 provides an analog current on line 78 whose value corresponds to that of the digital difference value signal. Line 78 is connected to a current-to-voltage converter 80 which has a voltage output that is applied to a buffer 82 via line 84. The output of the buffer 82 appears on line 86 which is extended to the negative input of the buffer 82 as well as to the positive input of a subtractor circuit 88 and to one terminal of an electronic switch 90. Subtractor circuit 88 corresponds to the subtractor 56 included in the block diagram of FIG. 1. The signal on line 86 is the analog equivalent of the line-by-line change in the time base error and comprises the value corresponding to the difference between the color burst phase of two successive horizontal lines. The output line 86 is also connected to the negative input 92 of an integrator 94 via the fixed resistors 96 and the adjustable resistor 98. The integrator 94 corresponds to the main integrator 42 included in the block diagram of FIG. 1, and its output appears on the line 100 which extends to a phase modulator such as the phase modulator 46 described with respect to the block diagram shown in FIG. 1. As described hereinbefore, the phase modulator generates the phase modulated clock signal that is utilized by the TBC-2 time base corrector to read the data from the video information signal memory of the time base corrector of which the afore-described circuitry of FIG. 5 is a part.

The value of the analog signal on line 86 is constant during each horizontal line following the color burst interval, and it is updated by a new difference value from the digital-to-analog converter 76 following the measurement of the phase error represented by each successive color burst. The constant value is integrated by the main integrator 94 to generate a straight line ramp component that corresponds to the straight line approximation of the phase change between successive color bursts, as has been described previously.

The main integrator 94 also forms part of the second order error correction approximation circuitry which is shown below the dotted line in the circuitry 50 of FIG. 5. As will be explained in further detail hereinbelow, integrator 94 performs the second integration of the approximation of the second order differential of the velocity error generated in accordance with equation (3) described hereinbefore with reference to the integrator 42 of FIG. 1. The main integrator 94 receives the integrated second order differential signal over line 92, which is connected to an adjustable resistor 102 that is in turn connected by line 104 to a jumper 106 which is connected through resistor 108 and line 110 to the output of the second order error signal approximation circuitry. The resistor 102 can be manipulated to vary the amplitude of the second order or curvature error correction component that is generated by the main integrator 94 as is necessary. The removal of the jumper 106 merely disables the entire second order correction apparatus, and the main integrator 94 then generates a ramp that only provides the straight line approximation correction; and there will be no second order correction added which would modify the ramp in the manner as previously discussed.

Turning now to the second order correction portion of the circuitry shown in FIG. 5, the analog value representing the difference between the velocity errors for successive horizontal lines is provided on line 86 which is applied to the subtractor 88 as well as to the electronic switch 90. The circuitry receives an early REF H signal provided by the TBC-2 time base corrector over line 112 for timing the updating of the color burst phase difference signal provided to the subtractor 88 by the latches 72. This early REF H signal corresponds to the horizontal rate REF H drive signal generated by the aforementioned sync generator included in the TBC-2 corrector. The early REF H signal triggers a monostable multivibrator or a one-shot 114 that has an output line 116 that extends to the electronic switch 90 as well as to a second electronic switch 118. The period of the one-shot 114 is adjusted to provide properly timed H rate switch activating signals early during the horizontal sync pulse interval for changing the position of the switch 90 from that shown to the opposite position to apply the difference value on line 86 to a capacitor 120. The timing is such that the switch 90 and capacitor 120 operate as a sample and hold circuit that holds the value applied thereto for an interval of approximately one horizontal line and, as will become more apparent from the following description of the second order error correction portion of the circuitry, serves to provide the additional one horizontal line delay described hereinbefore with respect to the one-line delay 52 of FIG. 1 that enables the generation of the difference value corresponding to the rate of change in burst phase over two successive lines of the video information signal. The capacitor 120 is coupled by line 122 to the input of the amplifier 124 whose output is in turn coupled via line 126, resistor 128 and line 130 to the negative input of the subtractor 88, the positive input of which is supplied by the subsequently occurring difference value from line 86 in the manner described hereinbelow. Thus, the subtractor 88 generates a difference signal on line 132 that comprises the difference between the burst phase differences represented by successive adjacent pairs of burst phase sample values. As explained hereinabove with reference to FIG. 1, this difference value represents an approximation of the second order differential of the time base error. In terms of specific samples, the subtractor 88 provides a single value of $(S_{N+1}-S_N)-(S_N-S_{N-1})$ for example. The output of the subtractor 88 is coupled by line 132 to the serially connected resistors 138 and 140 coupled by line 142 to an input of amplifier 144. These resistors and amplifier together with a capacitor 146 define an integrator which, like the integrator 60 of FIG. 1, performs the first integration of the difference value representation of the second order differential of the time base error, producing an integrated difference value at its output connected to line 150. The previously-described DC value employed to cause the integrated output to have a zero average DC value is obtained by coupling the output of the amplifier 124 via resistor 136 to line 132 extending to the input of the integrator 144. The negative input of the subtractor 88 is also connected to a resistor 156 which in turn is connected to the wiper arm of an adjustable resistor 158. These resistors determine the value of the DC component coupled to line 132 and control the operation of the subtractor 88 so that the integrator 144 is maintained operationally stable.

The output of the integrator 144 appears on line 150 which extends to a summing junction 152 via resistor 154, and the summing junction 152 is connected to an amplifier 155. The output of the amplifier 155 is coupled to line 110, which provides an integrated difference value, which as described hereinbefore is a linearly varying ramp, with sufficient D.C. offset so that its value is zero at the center point of the ramp. The adjustable resistor 140 can be adjusted to provide the proper balance between a D.C. value appearing on line 132 and the integrated output from line 150 with the balance enabling the linear ramp to pass through zero at its center. This insures that the resulting second order or curvature correction component that is produced will be symmetrical about zero D.C. In this regard, the ramp signal that is generated by the integrator 144 and appears on line 150 will be a straight line ramp of either positive or negative slope, and the D.C. value provided by the amplifier 124 changes the D.C. component of the ramp signal so that one-half of its length is above zero D.C. and the other half is below zero. This is controlled by adjusting the resistor 140 so that the zero D.C. crossing point of the generated ramp signal occurs at the middle of the length of the generated ramp. When this is done, a symmetrical second order or curvature error correction component such as is shown in FIG. 4 is generated by the second integrator 94. With respect to the shape of the integrated difference value signal provided on line 110, if the rate of change of actual velocity error is increasing during the measuring interval, a ramp signal having a positive slope will be produced. Of course, a ramp signal having a negative slope will be produced if the rate of change of velocity error is decreasing.

The updating of the second order differential signal generated by the subtractor 88 is accomplished by controlling the clocking of the latches 72 relative to the activation of the switch 90. The clocking is controlled so that the latches receive and provide at their outputs a new burst phase difference representative signal shortly after the switch 90 has been activated by the occurrence of an early REF H signal on line 112. More specifically, during each reference horizontal sync pulse interval defined by the sync generator included in the TBC-2 time base corrector, an early REF H signal is placed on line 112; and switch 90 is activated by the switch activating signal generated by the one-shot multivibrator 114 to couple the analog representation of the burst phase difference signal then present on line 86 to the capacitor 120. The period of the one-shot multivibrator 114 is selected so that the switch 90 is closed for a time (about three microseconds) that is sufficient to allow the capacitor to charge to the value of the burst phase difference representative signal on line 86. It should be appreciated that the timing of the operation of the velocity error correction circuitry illustrated in FIGS. 1 and 5 can be controlled by reference timing signals provided by the sync generator of the TBC-2 time base corrector because, as described herebefore, the beginning of each horizontal line of the video information signal is free of time base error. Since the beginning of each horizontal line of video information is free of time base error, no timing disparity will exist between the video information signal and the stable reference timing at that time.

During the reference horizontal sync pulse interval shortly after the deactivation of switch 90 by the termination of the switch activating signal provided by the one-shot multivibrator 114, the latches 72 are clocked to receive and provide at their outputs the next successive digital burst phase difference representative signal then present on input lines 70. The following digital-to-analog converter 76 and amplifier circuitry 80 and 82 responsively couple the analog equivalent of the next digital burst phase difference representative signal to line 86 extending to the positive input of the subtractor 88. The analog equivalent signal remains on line 86 until the next updating operation, which occurs during the next reference horizontal sync pulse interval. Consequently, the subtractor 88 receives two burst phase difference representative signals for the entire active video information portion of the horizontal line interval to be compensated for progressively varying time base errors and is able to determine the second differential of the velocity error and effect the generation of a corresponding second order error correction signal.

The clock signal for the latches 72 is generated by circuitry shown in FIG. 5 that is operated with reference to a horizontal line rate REF H signal coupled to line 162. The REF H signal is selected to occur about one microsecond after the occurrence of the early REF H signal on line 112 and is conveniently obtained from the read address generator that provides read address memory select signals synchronous to the reference timing signals provided by the sync generator included in the TBC-2 time base corrector for controlling the read-out of the video information signal from the corrector's memory. The RAO read address memory select signal is employed to generate the REF H signal placed on line 162. A buffer 164 has its input coupled to receive the REF H signal placed on line 162 and responsively provides a corresponding signal at its output coupled to a differentiating circuit formed by the resistor 167 and a following gate 168. The differentiating circuit and gate 168 cooperate to generate a trigger signal which triggers a one-shot multivibrator that is coupled to update and initialize the error correction signal generating circuit. More specifically, the one-shot multivibrator 170 has one output coupled by line 184 that extends to the clock input of the latches 172 to effect the receipt and storage of new digital color burst phase difference representative signals as previously described.

To initialize the error correction signal generating circuit, the one-shot multivibrator 170 has its second output coupled to line 172 that is connected through a resistor 174 to the base of a drive transistor 176. The collector of the transistor 176 is connected to the gate of a transistor 178 by line 180 and resistor 182. Each time the one-shot multivibrator 170 is triggered by the REF H signal to issue a clock signal, the transistor 178 is gated to short the capacitor 188 of the main integrator 94 and thereby reset the integrator to zero in preparation of the generation of a new ramp signal corresponding to a new second order differential representation of the velocity error, as determined by the subtractor 88. The first integrator 144 of the second order error correction approximation circuitry is similarly reset by shorting its capacitor 146 by coupling the switch activating signal generated by the one-shot multivibrator 114 to activate the switch 118 upon each occurrence of an early REF H signal on line 112.

The general operation of the circuitry has been described, and other components are generally provided to carry out protective and inhibiting operations under certain conditions. A line 186 is coupled to receive a NO BURST/BURST level signal provided by the TBC-2 time base corrector and apply it to a second input of the gate 168. This level signal inhibits the REF H signal from clocking the input latches 172 when the signal applied to the line 186 is low which occurs when no burst is present. Thus, if a difference value were calculated it would be in error if burst was not actually present. In operation, the circuitry merely waits until a ligitimate burst is received before performing the above-described first and second order correction operations. A line 190 clears the latches when a low signal is applied, and this line is controlled by the occurrence of an overload condition of the TBC-2 memory or during the conduct of a testing procedure with the TBC-2 time base corrector.

From the foregoing description, it should be appreciated that an apparatus and method has been described which offers superior performance in terms of correcting varying time base errors; and the apparatus significantly exceeds the performance characteristics of prior art devices. The second order approximation of the varying time base error, i.e., measuring the rate of change of the error utilizing, for example, three successive samples of the time base synchronizing component of an information signal, permits a second order or curvature correction component to be added to the first order correction component, which greatly increases the error frequency correction range above that which was achieved by the prior art first order correction devices. In this regard, the use of three samples permits velocity error correction up to about 2500 Hz as opposed to an optimum level of about 800 Hz for the first order linear approximation correction devices. However, more accurate second order approximation of varying time base errors can be obtained by utilizing four or more successive samples of the time base synchronizing component contained in a composite information signal to determine the rate of change of the error. For example, the embodiment of FIG. 1 could be modified by inserting circuitry after the subtractor 56, and before the inputs of the adder 62 and integrator 60, for providing an average of successive difference values provided by the subtractor 56. This would be accomplished by coupling a one-line delay to the output of the subtractor 56 and coupling the output of the one-line delay and the output of the subtractor to the input of an averaging circuit. This arrangement of one-line delay and averaging circuit would provide a running average of successive difference values generated by the subtractor 56. The running average of successive difference values would be coupled to the adder 62 and integrator 60 for processing in the manner described hereinbefore to obtain the second order error correction signal.

The improved performance is obtained with little modification to the construction of existing time base correctors, and the invention is particularly suited for digital time base correctors of the type described herein and can be relatively easily added on to existing circuitry at a reasonable cost.

It should be noted that the preferred embodiment of the present invention has been described as arranged to cooperate with existing typical digital time base correctors, such as the TBC-2 manufactured by Ampex Corporation; and, therefore, the generated velocity error correction signal is coupled to phase modulate the read clock signal employed to retrieve the information signal stored in the corrector's memory. However, the error correction signal generated by the circuitry illustrated by FIGS. 1 and 5 could be employed to modulate the write clock signal as well. In such embodiment, the line-by-line adjustment of the write clock signal would be effected as described hereinbefore with reference to prior art time base correctors; and the circuitry, such as illustrated by FIGS. 1 and 5, would be coupled to the write clock signal generator circuitry to introduce velocity error compensating phase modulation to the write clock signal. Thus, the write clock signal would control the duration that the information signal is stored in the corrector's memory to compensate for all time base errors present in the signal. In such arrangements, suitable signal delays must be provided to enable the generation of the velocity error correction signal prior to the storage of the video information signal in the time corrector's memory.

While certain preferred embodiments have been illustrated and described, various modifications, equivalents and alternatives will become apparent to those skilled in the art. Accordingly, the scope of the present invention should be defined only by the appended claims and equivalents thereof.

Various features of the invention are set forth in the following claims.

What is claimed is:

1. Apparatus for generating second order error correction signals for compensating time base errors in a color video information signal including horizontal line and color burst time base synchronizing components, comprising:

first means for receiving a representation of the phase of the color burst component of said video information signal from each of at least three horizontal lines;

second means coupled to said first means for measuring and generating a phase difference signal representative of a phase difference between the phase representations of consecutive ones of said color burst components;

third means coupled to said second means for measuring changes in measured phase difference represented by successive phase difference signals and responsively generating a signal indicative of the rate of change of phase of the color burst component; and fourth means coupled to said second and third means for generating an error correcting signal that is proportional to said measured phase difference and said rate of change of the phase of the color burst component.

2. Apparatus as defined in claim 1 wherein said fourth means includes first integrating means for generating a ramp signal in response to said phase difference signal for an interval corresponding to that defined by consecutively received phase representations of the color burst component to thereby provide a first order approximation of said time base error.

3. Apparatus as defined in claim 2 wherein the third means for measuring changes in measured phase difference comprises:

means for receiving a first phase difference signal representative of the phase difference between an adjacent pair of color burst components and holding the same for one horizontal line;

means for receiving a second phase difference signal representative of the phase difference between the next subsequently occurring adjacent pair of color burst components; and means for subtracting the first phase difference signal and the second phase difference signal to thereby generate said signal indicative of the change in the phase difference.

4. Apparatus as defined in claim 3 including:

means coupled to said subtracting means for integrating said phase difference change signal to obtain an integrated phase difference change signal and applying same to said first integrating means; and means for generating and combining a D.C. offset signal with the integrated phase difference change signal applied to said first integrating means, said D.C. offset signal generating means being adjustable to generate said D.C. offset signal so that said integrated phase difference change signal is symmetrical about a selected D.C. level.

5. Apparatus as defined in claim 4 including means coupled to said first integrating means for adjusting the maximum deviation of said error correction signal from a straight line variation in accordance with the phase difference change signal.

6. Apparatus for correcting velocity errors in a color video information signal including horizontal line and color burst time base synchronizing components utilizing a time base error corrector of the type which receives and writes the color video information signal into a memory means and wherein the color video information signal is read from said memory means using a clock signal that is phase modulated to remove velocity errors, comprising:

first means responsive to consecutive color burst components for deriving a value representative of the velocity error between consecutive color burst components and generating a first error signal that is proportional to said derived velocity error value;

second means responsive to consecutive color burst components for deriving a value representative of the rate of change of the velocity error and generating a second error signal that is proportional to said rate of change of velocity error value; and third means responsive to said first and second error signals for producing a phase modulated clock signal for removing said derived velocity errors.

7. Apparatus as defined in claim 6 wherein said third means includes means for integrating said first error signal to produce a ramp signal for an interval corresponding to that defined by consecutive color burst components that linearly follows the velocity error.

8. Apparatus as defined in claim 7 wherein said third means includes means for integrating said second error signal to produce a curvature component signal, said first error signal integrating means being coupled to said second error signal integrating means for receiving and integrating said curvature component signal to vary the slope of the ramp signal according to the rate of change of velocity error represented by the second error signal.

9. Apparatus as defined in claim 8 wherein said phase modulating is adapted to accurately follow velocity errors up to approximately 2500 Hertz.

10. Apparatus as defined in claim 7 wherein said second means comprises:
means for receiving a first value representative of the velocity error from said first means and holding the same for one horizontal line;
means for receiving the next occurring value representative of the velocity error obtained from said first means; and
means for subtracting the first value and said next occurring value to thereby obtain a resulting value representing the change in the value of the velocity error.

11. Apparatus as defined in claim 10 wherein said third means further includes:
means for integrating said resulting value to produce a curvature component signal that is applied to said first integrating means; and
means for generating and combining a D.C. offset signal with the curvature component signal applied to said first integrating means, said D.C. offset signal generating means being adjustable to generate said D.C. offset signal so that said curvature component signal is symmetrical about a selected D.C. level.

12. Apparatus as defined in claim 11 including means coupled to said first integrating means for adjusting the maximum deviation of said ramp signal from a linear variation in accordance with the resulting value provided by the subtracting means.

13. In a time base corrector apparatus for use in correcting velocity errors of an information signal and being of the type which has memory means into which the information signal is stored and having a clock means for controlling the rate at which the information signal is retrieved from said memory means, the improvement comprising means for measuring the rate of change of the velocity errors and generating an error signal proportional thereto, means responsive to said error signal for generating an error correcting signal, and means coupling said error correcting signal to modulate said clock signal means for removing the velocity errors.

14. A method for performing second order error compensation of time base errors in a color video information signal including horizontal line and color burst time base synchronizing components, comprising the steps of:
measuring the phase difference between an adjacent pair of color burst components;
measuring the change in the measured phase difference between successive adjacent pairs of color burst components; and
adjusting the time base of the color video information signal in accordance with the measured change in the measured phase difference to effect second order compensation of said time base errors.

15. A method of correcting velocity errors in a color video information signal including horizontal line and color burst time base synchronizing components in a time base error corrector of the type which receives and writes digital data samples of the color video information signal into a digital memory means and wherein the digital data samples are read from said memory means using a clock signal that is phase modulated to remove velocity errors, comprising the steps of:
deriving the velocity error contained in each horizontal line of the color video information signal from the phase of consecutive color burst components;
generating a first error signal that is proportional to said derived velocity error;
deriving the rate of change of said velocity error from the phase of consecutive color burst components;
generating a second error signal that is proportional to said derived rate of change of velocity error; and
phase modulating said clock signal to thereby remove said derived velocity errors in response to the first and second error signals.

16. In a time base corrector apparatus for correcting time base instabilities that progressively change in an information signal having a periodically occurring time base synchronizing component, said time base corrector apparatus of the type which includes a memory means that stores the information signal for an interval that varies in accordance with the time base instability with the storage interval controlled by a time base adjustable clock signal, the improvement comprising:
first means responsive to consecutive time base synchronizing components for generating a first error signal indicative of the change in the time base instability as represented by consecutive time base synchronizing components;
second means repsonsive to consecutive time base synchronizing components for generating a second error signal indicative of the rate of the change in the time base instability as represented by consecutive time base synchronizing components; and
third means responsive to said first and second error signals for generating a time modulated clock signal for controlling the interval that the information signal is stored in said memory means.

17. Apparatus as defined in claim 16 wherein said first means is responsive to two consecutive time base synchronizing components for generating said first error signal, and said second means is responsive to at least three consecutive time base synchronizing components for generating said second error signal.

* * * * *